US011928541B2

(12) United States Patent
Mangione et al.

(10) Patent No.: US 11,928,541 B2
(45) Date of Patent: Mar. 12, 2024

(54) DEVICE AND METHOD FOR DETECTING OPENING OF OR AN ATTEMPT TO OPEN A CLOSED CONTAINER

(71) Applicant: STMicroelectronics (Rousset) SAS, Rousset (FR)

(72) Inventors: Jose Mangione, Mougins (FR); Andrei Tudose, Chateauneuf (FR); Pierre Yves Baudrion, Tourrettes sur Ioup (FR); Joran Pantel, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 148 days.

(21) Appl. No.: 17/292,149

(22) PCT Filed: Oct. 23, 2019

(86) PCT No.: PCT/FR2019/052521
§ 371 (c)(1),
(2) Date: May 7, 2021

(87) PCT Pub. No.: WO2020/099747
PCT Pub. Date: May 22, 2020

(65) Prior Publication Data
US 2021/0397920 A1  Dec. 23, 2021

(30) Foreign Application Priority Data
Nov. 12, 2018  (FR) ...................................... 1860418

(51) Int. Cl.
*G06K 19/077* (2006.01)
*G06K 19/07* (2006.01)
(Continued)

(52) U.S. Cl.
CPC ... *G06K 19/07798* (2013.01); *G06K 19/0722* (2013.01); *H01Q 7/00* (2013.01); *H04B 5/0062* (2013.01); *H04B 5/0075* (2013.01)

(58) Field of Classification Search
CPC ......... G06K 19/0722; G06K 19/07798; H01Q 7/00; H04B 5/0062; H04B 5/0075
See application file for complete search history.

(56) References Cited

U.S. PATENT DOCUMENTS 3,763,430 A * 10/1973 Terrey ................ G01R 31/2805
324/540
2005/0231365 A1* 10/2005 Tester .................... G09F 3/0347
292/307 R
(Continued)

FOREIGN PATENT DOCUMENTS

CN  1828524 A  9/2006
CN  1991871 A  7/2007
(Continued)

OTHER PUBLICATIONS

INPI Search Report and Written Opinion for FR 1860418 dated Jun. 11, 2019 (8 pages).
(Continued)

*Primary Examiner* — Omer S Khan
(74) *Attorney, Agent, or Firm* — Crowe & Dunlevy

(57) ABSTRACT

A closed container includes a detection device for detecting opening of or an attempt to open the container. The detection device includes a contactless passive transponder that is configured to communicate with a reader via an antenna using a carrier signal. An integrated circuit of the transponder includes two input terminals connected to the antenna and two output terminals linked by a first electrically conductive wire having a severable part which is severed in the event of an opening of or an attempted opening of the container. A shorting circuit is configured to short-circuit a (Continued)

first output terminal with a first input terminal in the event of a conductive repair of the severed part which forms an electrical connection between the two output terminals.

10 Claims, 12 Drawing Sheets

(51) Int. Cl.
*H01Q 7/00* (2006.01)
*H04B 5/00* (2006.01)

(56) References Cited

U.S. PATENT DOCUMENTS

| | | | | |
|---|---|---|---|---|
| 2012/0081142 | A1* | 4/2012 | Weekly | B23K 26/38 326/8 |
| 2013/0300453 | A1* | 11/2013 | Carapelli | G08B 13/06 326/8 |
| 2017/0183135 | A1* | 6/2017 | Pic | G06K 19/07381 |
| 2020/0401867 | A1* | 12/2020 | Dehmubed | G06K 19/07722 |
| 2021/0142631 | A1* | 5/2021 | Bella | G08B 13/2448 |
| 2022/0075906 | A1* | 3/2022 | Ahmed | G06F 21/72 |

FOREIGN PATENT DOCUMENTS

| | | |
|---|---|---|
| CN | 203376772 U | 1/2014 |
| CN | 104252633 A | 12/2014 |
| CN | 107657301 A | 2/2018 |
| CN | 108388938 A | 8/2018 |
| FR | 3038102 A1 | 12/2016 |

OTHER PUBLICATIONS

International Search Report and Written Opinion for PCT/FR2019/052521 dated Jan. 23, 2020 (10 pages).

First Office Action and Search Report for counterpart CN Appl. No. 201980074299.6, report dated Dec. 1, 2023, 8 pgs.

* cited by examiner

DEVICE AND METHOD FOR DETECTING OPENING OF OR AN ATTEMPT TO OPEN A CLOSED CONTAINER

PRIORITY CLAIM

This application is a 371 national stage filing PCT Application Number PCT/FR2019/052521, filed Oct. 23, 2019, and further claims priority from French Application for Patent No. 1860418, which was filed on Nov. 12, 2018, the contents of which are hereby incorporated by reference in their entireties to the maximum extent allowable by law.

TECHNICAL FIELD

Modes of implementation and embodiments relate to contactless passive transponders, in particular NFC ("near-field communication") transponders, for example tags and, in particular, to the use of such transponders for detecting opening of or an attempt to open a closed container containing, for example, a product of value, for example a perfume bottle, by a malicious third party.

BACKGROUND

Near-field communication (NFC) is a wireless connectivity technology that allows communication over a short distance (e.g., 10 cm) between electronic devices, such as contactless chip cards or tags, and readers.

More generally, NFC technology is a technology that has been standardized by the NFC Forum Consortium.

NFC technology is particularly suitable for connecting any type of user device and allows fast and easy communication.

A contactless transponder is a transponder that is configured to exchange information via an antenna with a contactless reader, in accordance with a contactless communication protocol.

An NFC transponder, which is a contactless transponder, is a transponder that is compatible with NFC technology.

NFC technology is an open technological platform that has been standardized in the ISO/IEC 18092 and ISO/IEC 21481 standards, but incorporates numerous other standards, such as for example the Type A and Type B protocols defined in the ISO-14443 standard, which may be communication protocols able to be used in NFC technology.

Contactless technology may also be used in RFID (RadioFrequency IDentification) transponders that are compatible with the ISO 15693 and ISO 18000-3 standards.

During a transmission of information between a reader and a passive transponder, the reader generates a magnetic field by way of its antenna, which is generally a sinusoidal wave (a carrier wave) at 13.56 MHz in the standards that are commonly used.

To transmit information from the reader to the transponder, the reader uses an amplitude modulation of the carrier.

The transponder, for its part, demodulates the carrier that is received in order to deduce therefrom the data transmitted from the reader.

For a transmission of information from the transponder to the reader, the reader generates the magnetic field (the carrier) without modulation. The antenna of the transponder then modulates the field generated by the reader, on the basis of the information to be transmitted. The frequency of this modulation corresponds to a subcarrier of the carrier. The frequency of this subcarrier depends on the communication protocol that is used, and may be for example equal to 848 kHz.

This modulation is performed by modifying the load connected to the terminals of the antenna of the transponder.

In other words, the transponder retromodulates the wave coming from the reader in order to transmit information and does not integrate emission circuitry as such, or a transmitter, that is configured, for example, to generate its own magnetic field to transmit the information by emission. Such a transponder without a transmitter is called a passive transponder, in contrast to an active transponder which includes a transmitter.

Generally, a passive transponder does not have a power supply, because it uses the wave coming from the reader to power its integrated circuit.

As indicated above, the transmission of information from the passive transponder to the reader is performed by load modulation.

Specifically, by modifying the load at the terminals of the antenna of the transponder, the output impedance of the antenna of the reader changes due to the magnetic coupling between the two antennas.

This load variation performed in the load modulation is reflected in an amplitude modulation and/or phase modulation of the signal (voltage or current) at the antenna of the reader. A copy of the antenna current is generated and injected into the reception chain of the reader, where it is demodulated and processed to extract the transmitted information.

Currently, in order to determine whether a product is able to be used or sold, it is becoming increasingly obligatory to determine whether the container containing the product has been opened, for example for the purpose of replacing the original product with a counterfeit product or a lower-quality product.

Visual inspection of the container no longer proves sufficient to detect the opening or attempted opening.

It has therefore been proposed to use a passive transponder equipped with an electrically conductive wire linking two output terminals of the integrated circuit with which this transponder is equipped to detect lack of opening or opening of the container, corresponding respectively to lack of severing or severing of the wire.

More precisely, the integrated circuit will compare the voltages present at the two output terminals in order to deduce severing or lack of severing of the wire therefrom.

However, it turns out that if the wire, once it has been severed, has been joined back together, for example by way of a solder or of an electrically conductive adhesive, the comparison of the voltages at the two output terminals of the integrated circuit will again correspond to lack of opening of the container, whereas in reality the container could effectively have been opened.

There is therefore a need to be able to detect severing of the wire followed by joining back together thereof, for example using a conductive adhesive or a solder point, which may then for example be synonymous with an attempt to open or opening of a container equipped with this wire with joining back together of this wire following the opening.

SUMMARY

According to one aspect, what is proposed is a system including a closed container, for example the packaging of a perfume bottle, without this example being limiting, and a detection device.

The detection device includes a contactless passive transponder configured to communicate with a reader, for example a cellular mobile telephone emulated in reader mode, via an antenna using a carrier signal.

The transponder includes an integrated circuit having two antenna terminals connected to the antenna and a first and a second additional terminal that are connected by a first electrically conductive wire.

This first electrically conductive wire has a severable part, and is designed to be severed at its severable part in the event of opening of or an attempt to open the container.

An opening attempt is for example an action intended to start opening the container without opening it completely.

The detection device also includes a shorting circuit configured to short-circuit the first additional terminal of the integrated circuit with another terminal of this integrated circuit (this other terminal, different from the second additional terminal, possibly being, for example, a first antenna terminal, this first antenna terminal itself being connected to the antenna, or even a third additional terminal of the integrated circuit) in the event of severing of the severable part and reconstruction of an electrical connection between the first and second additional terminals.

According to one embodiment, the system has a first configuration in which the first electrically conductive wire is not severed and electrically insulated from the shorting circuit, and a second configuration in which the first electrically conductive wire is severed at its severable part to form two wire parts, the ends of the two wire parts being electrically joined back together by an electrically conductive joining circuit, for example a pad of electrically conductive adhesive or a solder, also coming into contact with a part of the shorting circuit.

According to one embodiment, the shorting circuit includes an electrically conductive element arranged close to the severable part of the first electrically conductive wire and linked to the other terminal by a second electrically conductive wire, this electrically conductive element being electrically insulated from the first electrically conductive wire in the absence of severing of this first electrically conductive wire.

According to one embodiment, the electrically conductive joining circuitry makes contact with the electrically conductive element and the first electrically conductive wire in the second configuration.

This electrically conductive element may comprise an electrically conductive surface element that may be rigid or flexible, such as a metal layer or a metal sheet.

In one possible embodiment, in the absence of severing of the first electrically conductive wire, the severable part of the first electrically conductive wire is for example supported by the surface element and electrically insulated from this surface element by an insulating layer.

Electrical insulation between the surface element and the first electrically conductive wire is then ensured in the first configuration of the system.

As a variant, the electrically conductive element may comprise an electrically conductive wire extending close to and along the severable part of the first electrically conductive wire, this electrically conductive wire and the first electrically conductive wire being separated in the absence of severing of this first electrically conductive wire.

Electrical insulation between these two wires is then ensured in the first configuration of the system.

By way of example, two wires are in this case considered to be close to (for example, adjacent) one another when they are spaced apart by between a few micrometers, for example 10 micrometers, and several millimeters.

For example, 200 micrometers may be one non-limiting example for the value of this spacing apart.

Regardless of the variant that is adopted to form the electrically conductive element, the first electrically conductive wire has a spiral shape in one zone.

The probability of the first wire being severed upon opening of or an attempt to open the container is then increased.

Plus, in combination with this spiral shape, it is particularly useful, when the electrically conductive element is an electrically conductive wire, for the latter also to have a spiral shape in the zone, the spiral shape being preferably interwoven in the spiral shape of the first electrically conductive wire.

This makes it even more difficult for a malicious third party to be able to reconstruct the severed first wire in the spiral while avoiding a short circuit with the electrically conductive wire forming the electrically conductive element.

As indicated above, according to a first possible variant, the other terminal may be a first antenna terminal.

In this case, the short circuit in the event of severing and reconstruction of the first conductive wire will occur between the first additional terminal and the antenna via the first antenna terminal, thereby leading to defective behavior of the transponder.

That being said, it may in some cases be particularly beneficial to keep a transponder operational even after the severed first conductive wire has been reconstructed.

There is therefore provision, in such a second variant, for the integrated circuit to include a third additional terminal (different from the antenna terminals and from the first and second additional terminals), the other terminal then being this third additional terminal.

According to one embodiment of this other variant, the integrated circuit includes generation circuitry configured to deliver a test signal to the first additional terminal, and detection circuitry configured to detect the presence or the absence of the test signal on the second additional terminal and on the third additional terminal.

This test signal has a specific pattern that is easily detectable. This test signal may, for example, be a square-wave pulse.

According to one embodiment of this other variant, in the first configuration (where the first wire is not severed and is not reconstructed), the detection circuitry is configured to detect the presence of the test signal on the second additional terminal and the absence of the test signal on the third additional terminal, and in the second configuration (where the first wire severed and is reconstructed), the detection circuitry is configured to detect the presence of the test signal on the second additional terminal and on the third additional terminal.

According to one embodiment, the system furthermore has an intermediate configuration in which the first electrically conductive wire is severed at its severable part to form the two wire parts that are not in electrical contact and are electrically insulated from the shorting circuitry, and the detection circuitry is then configured, in this intermediate configuration, to detect an absence of the test signal on the second additional terminal and on the third additional terminal.

According to another aspect, what is proposed is a method for detecting severing of the severable part of the first electrically conductive wire followed by reconstruction of an electrical connection between the first and second additional terminals of the device belonging to the system as defined above in the first variant. The method includes, when the transponder is present in a non-defective state, lack of response from the transponder in the presence of a magnetic field emitted by the reader.

According to another aspect, what is proposed is a method for detecting severing of the severable part of the first electrically conductive wire followed by reconstruction of an electrical connection between the first and the second additional terminal of the device belonging to the system as defined above in the second variant. This method includes generating a test signal on the first additional terminal and detecting the test signal on the second and the third additional terminal.

BRIEF DESCRIPTION OF THE DRAWINGS

Other advantages and features will become apparent on examining the detailed description of wholly non-limiting modes of implementation and embodiments and the appended drawings, in which.

DETAILED DESCRIPTION

Figure 1:
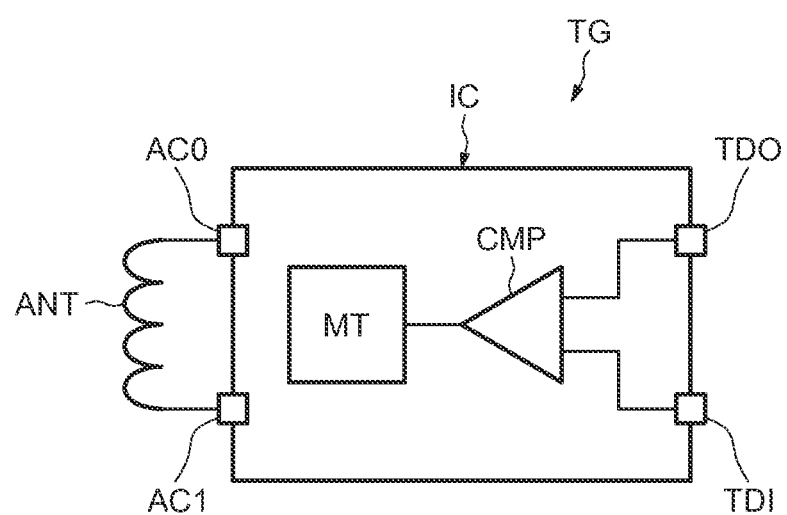
FIG. 1 schematically illustrates an exemplary architecture of a passive transponder described herein, FIG. 2 schematically illustrates one embodiment of a system including a passive transponder disclosed herein, FIG. 3 schematically illustrates an exemplary placement of a detection device including a passive transponder disclosed herein on a closed container, FIG. 4 schematically illustrates the detection device of FIG. 3 hidden by a cover.

In FIG. 1, the reference TG denotes a contactless passive transponder, for example a tag. In this example, the contactless passive transponder is configured to communicate with a reader (not shown here) via its antenna ANT by using a carrier signal having a frequency of, for example, 13.56 MHz.

The passive transponder is in this case a transponder that is configured for communicating using a contactless communication protocol that uses near-field communication (NFC) technology, for example.

This transponder may also be an RFID transponder using this NFC technology.

This transponder TG comprises an integrated circuit IC, for example an integrated circuit of the ST25 family marketed by STMicroelectronics.

The integrated circuit IC includes two input terminals AC0 and AC1 that are respectively connected to the two terminals of the antenna ANT.

The integrated circuit IC also includes a processing circuit MT which includes, for example, an energy recovery circuit, a microprocessor and/or a wired logic unit, and also a memory. The processing circuit is configured to:

deliver a supply voltage to the entire integrated circuit on the basis of the magnetic field received from a reader, and process the information received from the reader and retromodulate the carrier signal for the purpose of transmitting information to the reader.

The integrated circuit IC also includes two output terminals TDO and TDI and a comparison circuit CMP configured to compare the voltage present at the output terminal TDO with the voltage present at the output terminal TDI and deliver the result of this comparison to the processing circuit MT.

Figure 2:
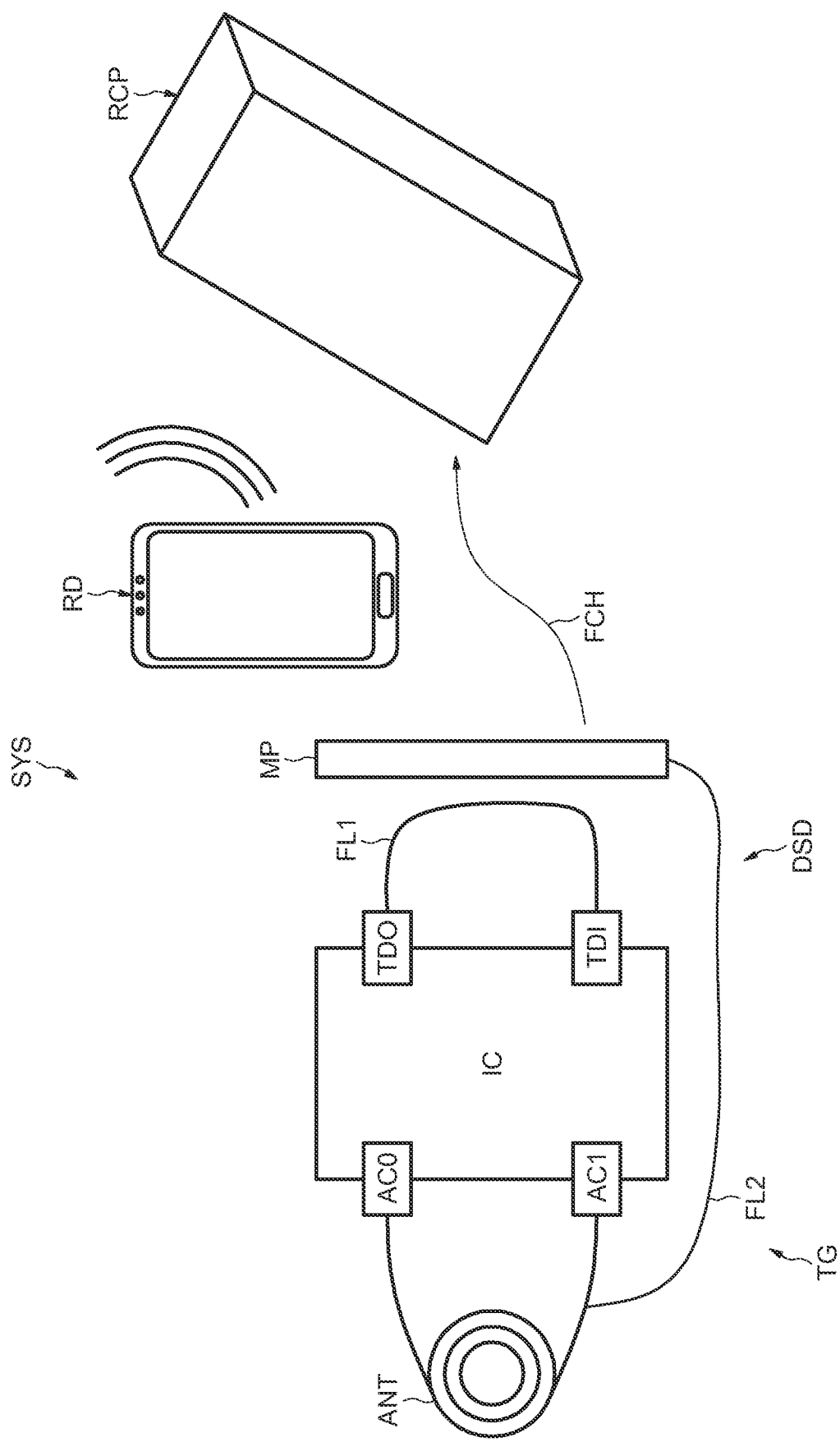

In FIG. 2, the reference SYS denotes a system including a detection device DSD that is configured, for example, to detect an attempt to open or opening of a closed container RCP that is configured, for example, to contain a product, for example a perfume bottle.

The detection device DSD includes the contactless passive transponder TG and a first electrically conductive wire FL1 linking the two output terminals TDO and TDI of the integrated circuit IC.

The processing circuit is configured to deliver a reference voltage on one of the output terminals, for example the terminal TDO. If the first wire FL1 is not severed, the voltage present on the other output terminal, for example the terminal TDI, depends on the reference voltage, on the resistance of the first wire and on a pull-down resistor connected between the terminal TDI and ground.

With a resistance of the first wire of less than 3.5 kilo-ohms and a pull-down resistance of the order of 20 kilo-ohms, a reference voltage is chosen such that the voltage on the terminal TDI is within a range of values causing, for example, a first logic value, for example a logic "1", to be delivered at the output of the comparator CMP.

The first logic value is then synonymous with integrity of the first wire FL1.

By contrast, if the first wire FL1 is severed, the voltage on the terminal TDI will be close to or equal to 0 (ground), causing a second logic value, for example a logic "0", to be delivered at the output of the comparator CMP.

The detection device also includes an electrically conductive element MP that is electrically insulated from the first electrically conductive wire FL1 when the container RCP is not open or has not been opened and then closed again.

The detection device DSD also includes a second electrically conductive wire FL2 linking a first input terminal, in this case the terminal AC1, of the integrated circuit IC to the electrically conductive element MP.

As illustrated by the arrow FCH, the detection device is intended to be appropriately placed on the closed container RCP, as will be described in more detail hereinafter.

Furthermore, a contactless reader RD, for example a cellular mobile telephone emulated in reader mode, is configured for communicating with the transponder TG.

Generally speaking, the first electrically conductive wire FL1 has a severable part, which may be all or part of the first wire, and the first electrically conductive wire is arranged on the container to be severed at its severable part in the event of opening of or an attempt to open the container.

Moreover, a shorting circuit in this case including the electrically conductive element MP and the second electrically conductive wire FL2 is configured to short-circuit a first output terminal, for example the terminal TDI, with a first input terminal, for example the terminal AC1, in the event of severing of the severable part of the first electrically conductive wire and subsequent reconstruction of an electrical connection between the two output terminals TDO and TDI.

Figure 3:
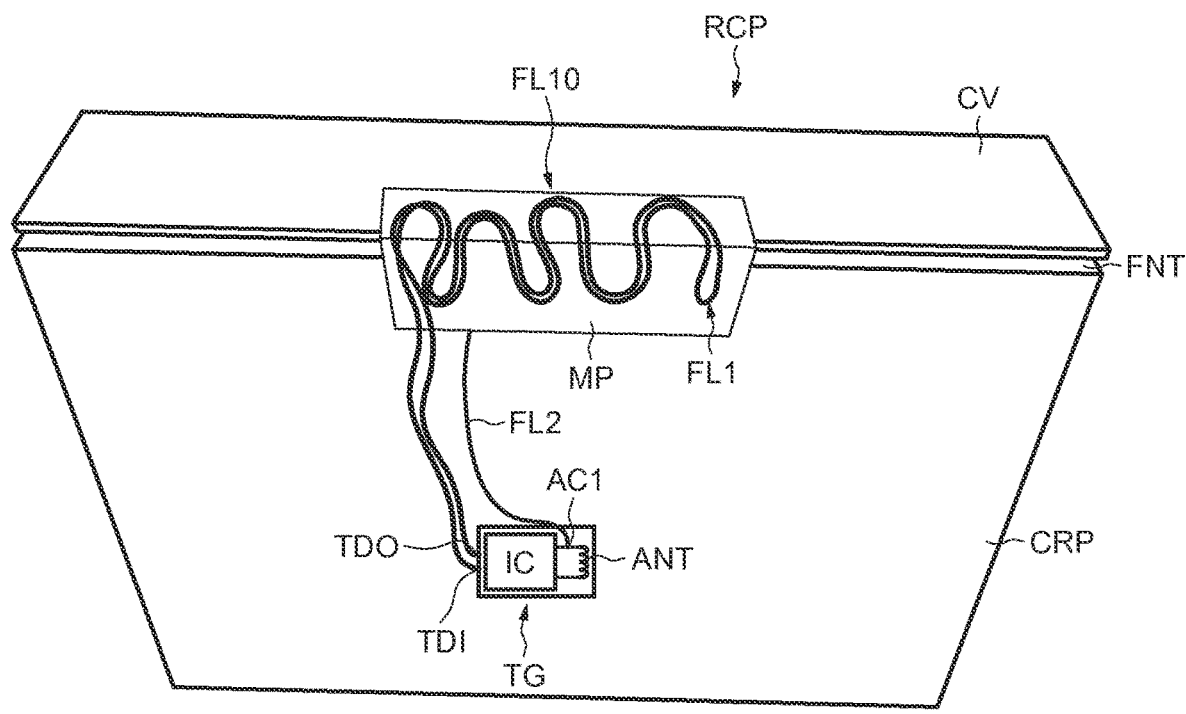

Reference is now made more particularly to FIG. 3 in order to illustrate an exemplary placement of the detection device on a container RCP.

In this example, the container RCP is a box having a body CRP that is closed by a lid CV forming a slot FNT with the body CRP.

In this highly schematic example, the electrically conductive element is a metal sheet MP attached firstly to the body CRP and secondly to the lid CV to cover part of the slot FNT.

The first electrically conductive wire FL1, surrounded by its insulating sleeve, snakes over the metal sheet MP to extend alternately over the lid and over the body CRP and thus cross over the location of the slot FNT.

This snaking part FL10 forms the severable part of the first electrically conductive wire.

Specifically, when the lid CV is opened, the wire FL1 will be severed at the severable part FL10.

The drawing of FIG. 3 is not to scale, and those skilled in the art will know how to select the appropriate diameter for the wire FL1 to help guarantee severing thereof when the lid CV is opened.

The transponder TG is, for example, attached to a wall of the body CRP.

The first wire FL1 is linked to the output terminals TDO and TDI, whereas the second electrically conductive wire FL2 links the metal sheet MP to the input terminal AC1, which is itself linked to the antenna ANT.

Figure 4:
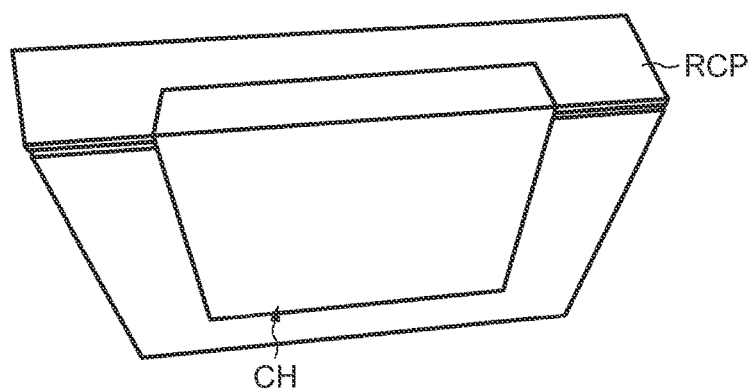

Next, once this assembly has been performed, the assembly is covered by a cover CH, as illustrated highly schematically in FIG. 4 which acts in some way to visually conceal the presence of the wire FL1 and metal sheet MP.

Figure 5:
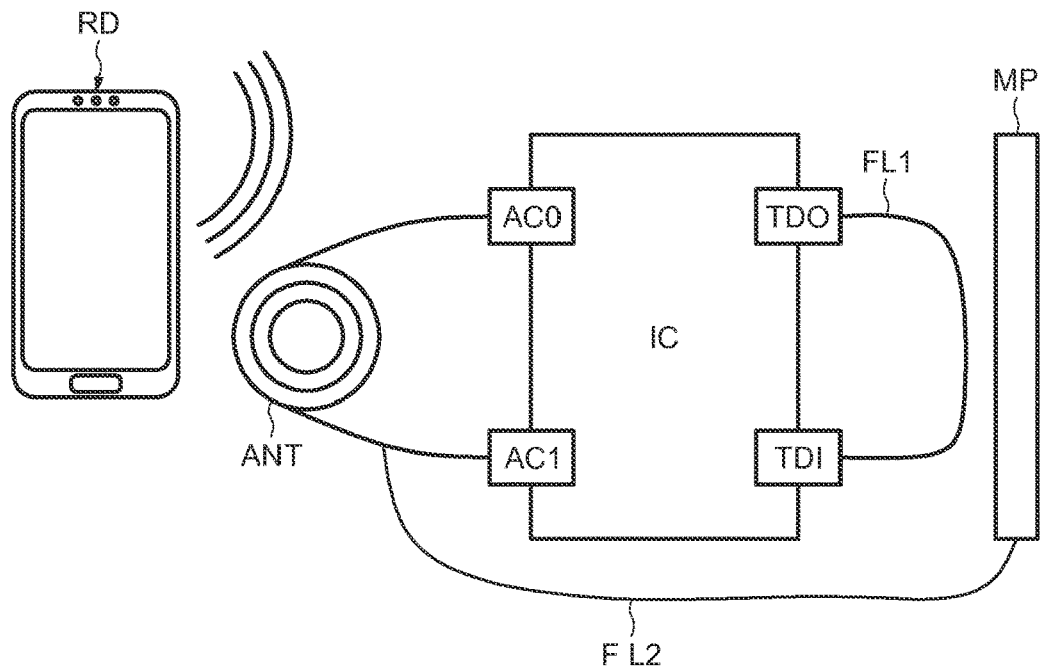
FIG. 5 illustrates a first configuration of the system of FIG. 2, FIG. 6 schematically illustrates an intermediate configuration of the system of FIG. 2, FIG. 7 schematically illustrates a second configuration of the system of FIG. 2.
Figure 6:
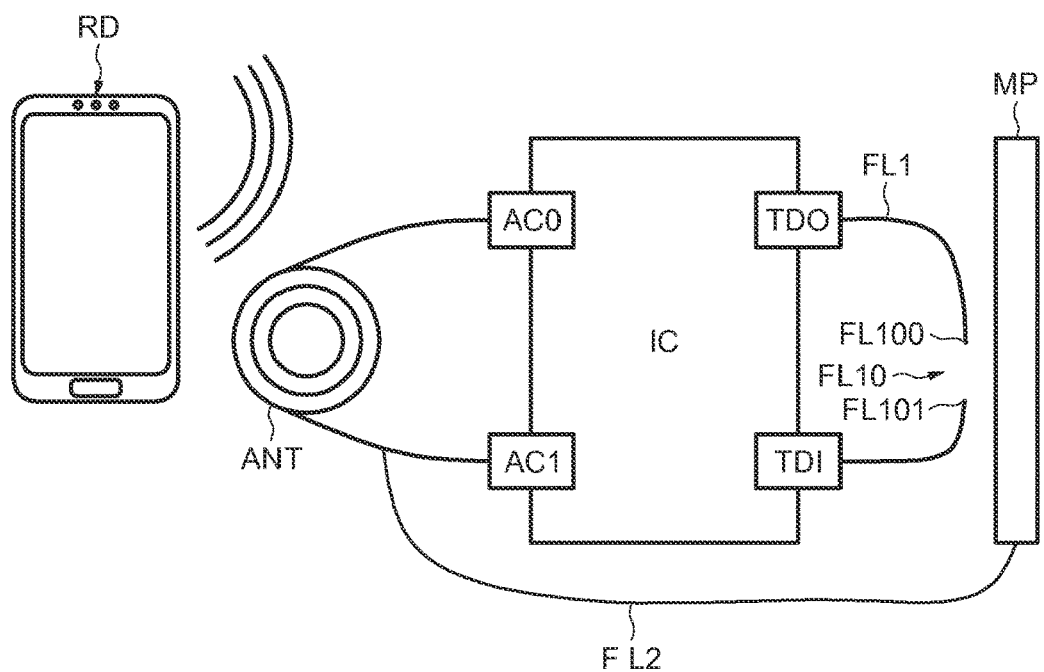
Figure 7:
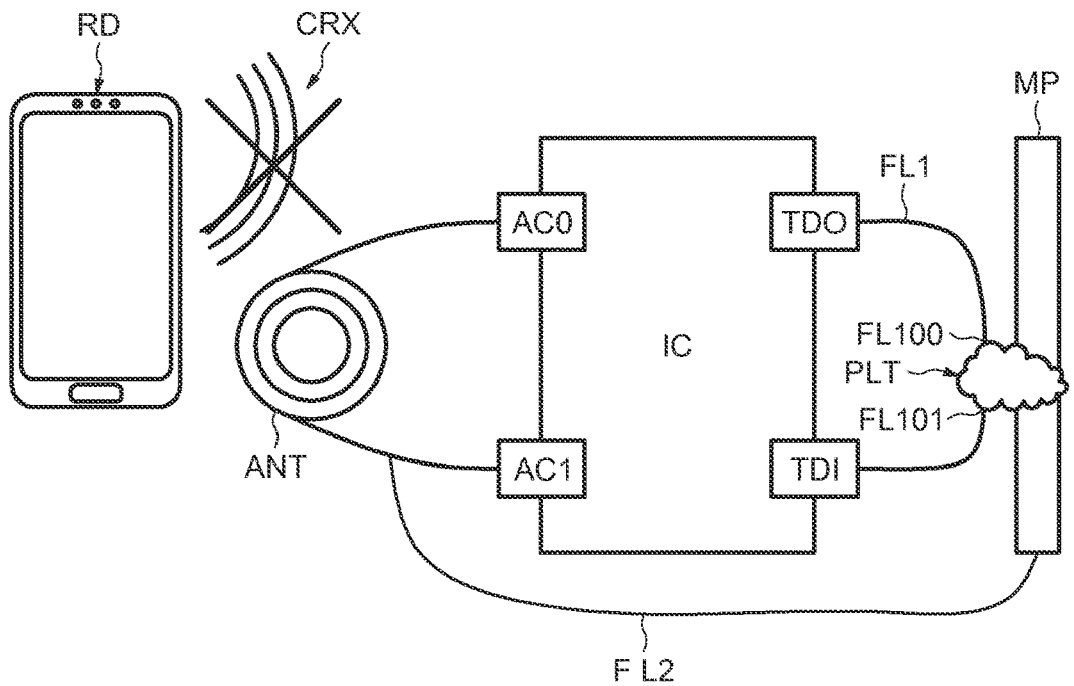

Reference is now made more particularly to FIGS. 5 to 7 in order to illustrate various configurations of the system SYS.

In a first configuration illustrated in FIG. 5, the first electrically conductive wire FL1 is not severed and is electrically insulated from the metal element MP.

The processing circuit of the circuit IC then receives the information corresponding to the logic "1" delivered at the output of the comparator CMP.

This information is transmitted to the reader RD during communication therewith.

This configuration is representative of an unsevered first wire FL1, corresponding in this case to an unopened container, and therefore that the product, for example the perfume bottle, is a valid product.

In FIG. 6, the system SYS has an intermediate configuration in which the severable part FL10 of the first conductive wire FL1 has been severed during an attempt to open or opening of the container RCP.

The two severed parts FL100 and FL101 of the first electrically conductive wire FL1 are not in electrical contact. Therefore, the comparator CMP will deliver a logic "0" and the corresponding information will be transmitted to the reader RD during communication between the reader RD and the transponder TG, signifying that the first wire FL1 has been severed, corresponding, for example, to the fact that the container RCP has undergone opening or an opening attempt, and the product therefore cannot be considered to be valid.

FIG. 7 illustrates a second configuration of the system SYS in which the first electrically conductive wire FL1, after having been severed during an opening attempt or opening of the container RCP, has been joined back together to re-establish the electrical connection between the two output terminals TDO and TDI.

More particularly, the two severed parts FL100 and FL101 of this wire have been brought back into electrical contact using an electrically conductive joining material, which is in this case a pad of conductive adhesive PLT, for example.

As a result of this operation, however, part of the adhesive pad PLT has also come into contact with the electrically conductive element MP, which therefore causes a short circuit via the second electrically conductive wire FL2 and the electrically conductive element MP, between the output terminal TDI (and incidentally the output terminal TDO) and the input terminal AC1, which is itself linked to the antenna ANT.

This second configuration is therefore representative of a wire FL1 that has been severed during an attempt to open or opening of the container RCP and that has been subsequently joined back together in an attempt to make it seem as if the wire had not been severed.

Plus, when the reader RD will attempt to interrogate the transponder TG (that is assumed to be in a non-defective state, for example an unbroken state), it will supply power to the integrated circuit IC with the magnetic field that it generates. However, as there is a short circuit between one of the output terminals of the integrated circuit and one of the input terminals of this same integrated circuit, and therefore also with the antenna ANT, a large part of the current flows in the second electrically conductive wire FL2 rather than flowing in the integrated circuit IC.

Therefore, the energy recovery circuit is not able to deliver a stable supply voltage to the entire integrated circuit, and the integrated circuit is not able to start up, and therefore the transponder becomes incapable of responding to the reader RD, this being shown by the cross CRX in FIG. 7.

Figure 8:
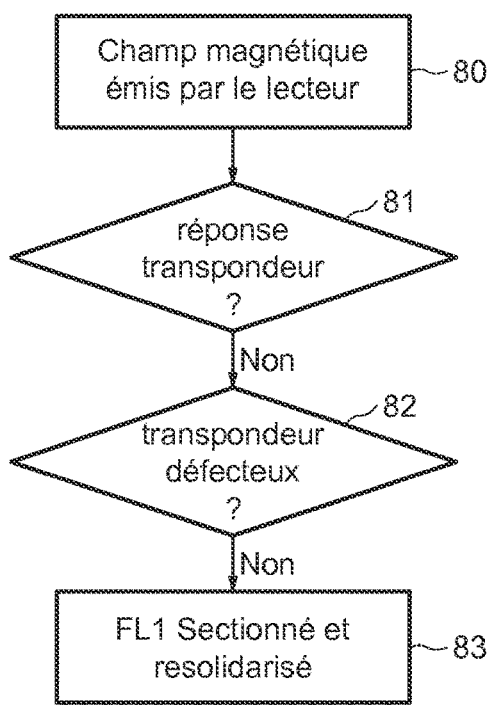
FIG. 8 illustrates an exemplary implementation of a method of detection or lack thereof of a passive transponder in order to determine whether a wire has been joined together after being severed, as disclosed herein.

Thus, as illustrated in FIG. 8, in the presence of a magnetic field emitted by the reader (step 80) and in the absence of a response from the transponder (step 81), which is assumed to be non-defective (step 82), it is detected that the first electrically conductive wire FL1 has been electrically joined back together after having been severed, which may be synonymous with opening of or an attempt to open the container.

By contrast, if the transponder TG is defective, then it may simply be said that it is not possible to verify the integrity of the product contained in the container using the detection device.

The disclosures herein are not limited to the embodiments and modes of implementation that have just been described.

Other forms of electrically conductive elements are thus possible. Other layouts of the first electrically conductive wire and of the electrically conductive element may be provided depending on the application contemplated and/or on the form of the container.

Likewise, depending on the application contemplated and/or on the form of the container, the severable part of the first electrically conductive wire could be situated in the immediate vicinity of the electrically conductive element without necessarily overlapping it.

Figure 9:
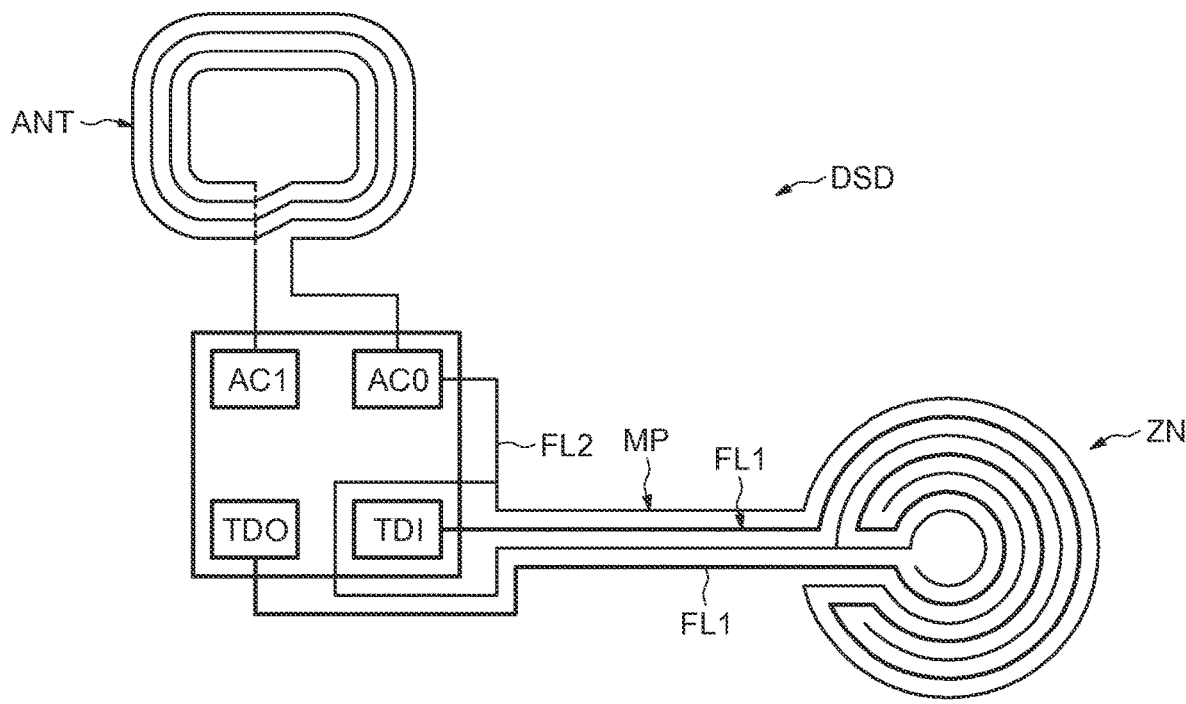
FIG. 9 illustrates another possible embodiment of a detection device disclosed herein.
Figure 10:
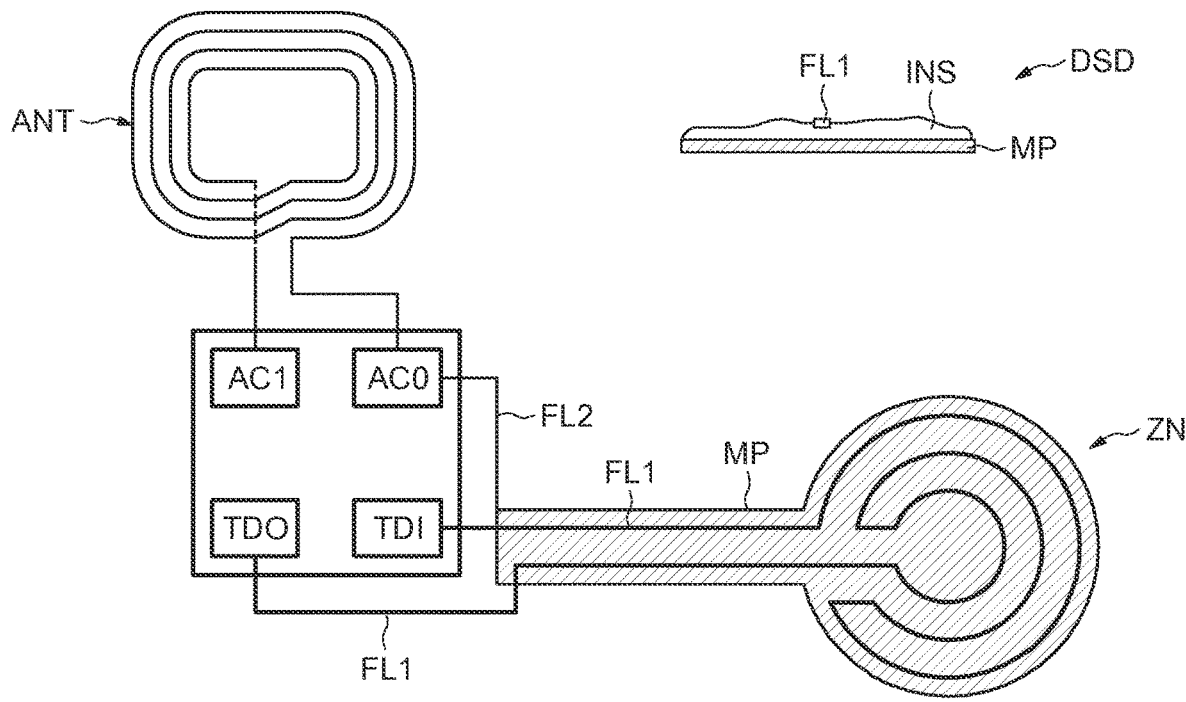
FIG. 10 illustrates yet another possible embodiment of a detection device disclosed herein.

In this respect, reference may be made more particularly to FIGS. 9 and 10, which schematically illustrate two other possible but non-limiting embodiments of the detection device DSD.

In FIG. 9, the first electrically conductive wire FL1 that links the two output terminals TDO and TDI includes rectilinear portions extended into a zone ZN by way of virtually complete and concentric circles.

The severable part of this wire FL1 may be considered to be all or part of the wire FL1.

The electrically conductive element MP in this example includes a wire situated close to the first wire FL1.

This wire MP also includes rectilinear portions interwoven with the rectilinear portions of the first wire FL1 and extended into the zone ZN by virtually complete and concentric circles that are interwoven with the concentric virtual circles of the first wire FL1.

The second wire FL2 links the wire MP to the input terminal AC0.

Electrical insulation between the first wire FL1 and the wire MP, when the container RCP is not open or has not been opened and then closed again, is in this case achieved by the space between these wires.

By way of indication, this space may be between 10 micrometers and several millimeters, for example 200 micrometers.

The diameter of the wires may also be between 10 micrometers and several millimeters, for example 200 micrometers.

In FIG. 10, the first electrically conductive wire FL1 that links the two output terminals TDO and TDI has the same form as that illustrated in FIG. 9.

By contrast, the electrically conductive element MP in this case includes a flexible or rigid electrically conductive surface element, for example a layer or a metal sheet, supporting the first electrically conductive wire FL1 by way of an insulating layer INS, having for example a thickness of 200 micrometers, which helps to ensure electrical insulation between the conductive layer MP and the wire FL1 when the container RCP is not open or has not been opened and then closed again.

The second electrically conductive wire FL2 links the conductive layer MP to the input terminal AC0.

Although the zone ZN has a circular shape in FIGS. 9 and 10, any other regular shape, for example a rectangular shape or irregular shape, would be possible.

More generally, the first electrically conductive wire FL1 may have a spiral shape in the zone ZN.

Plus, if the electrically conductive element MP also includes a wire, as is the case in FIG. 9, this electrically conductive wire MP may have a spiral shape in the zone ZN, which spiral shape is interwoven in the spiral shape of the first electrically conductive wire FL1.

By way of non-limiting example, the distance between the integrated circuit IC and the zone ZN may be between a few millimeters and around a meter, and the length of the first wire FL1 may be between a few centimeters and around 2 meters.

Reference is now made more particularly to FIGS. 11 to 20 in order to explain another variant described herein.

Figure 11:
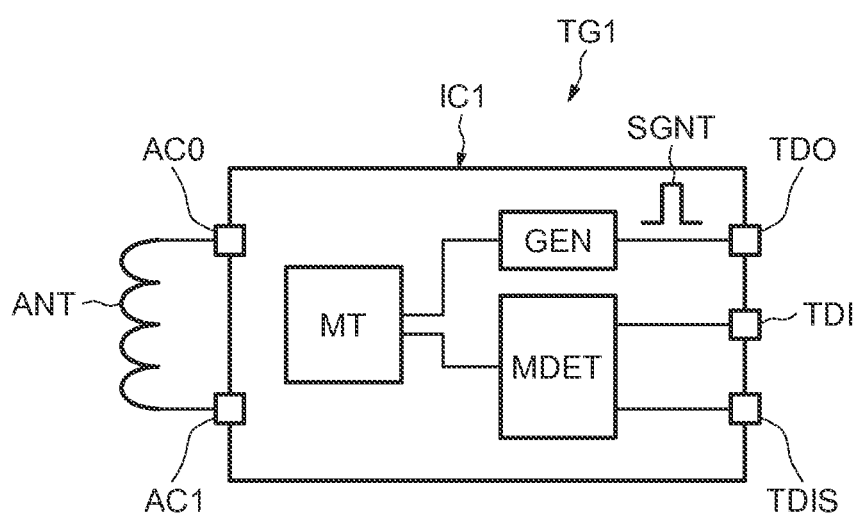
FIG. 11 illustrates a further embodiment of a passive transponder disclosed herein, FIG. 12 schematically illustrates another exemplary placement of a detection device disclosed herein on a closed container, FIG. 13 schematically illustrates a further exemplary placement of a detection device disclosed herein on a closed container, FIG. 14 schematically illustrates the detection device of FIG. 13 hidden by a cover.

In FIG. 11, the reference TG1 denotes a contactless passive transponder, for example a tag. In this example, the contactless passive transponder is configured to communicate with a reader (not shown here) via its antenna ANT by using a carrier signal having a frequency of for example 13.56 MHz.

The passive transponder is in this case a transponder that is capable of communicating using a contactless communication protocol that uses near-field communication (NFC) technology, for example.

This transponder may also be an RFID transponder using this NFC technology.

This transponder TG1 comprises an integrated circuit IC1, for example an integrated circuit of the ST25 family marketed by STMicroelectronics.

The integrated circuit IC1 includes two terminals, called antenna terminals AC0 and AC1, which are respectively connected to the two terminals of the antenna ANT.

The integrated circuit IC1 also includes processing circuitry MT, including for example an energy recovery circuit, a microprocessor and/or a wired logic unit, and also a memory. The processing circuitry is configured to deliver a supply voltage to the entire integrated circuit on the basis of the magnetic field received from a reader, and process the information received from the reader and retromodulate the carrier signal for the purpose of transmitting information to the reader.

The integrated circuit IC1 also includes a first additional terminal TDO, a second additional terminal TDI and a third additional terminal TDIS.

These three additional terminals are separate and different from the antenna terminals AC0 and AC1.

The integrated circuit IC1 also includes generation circuitry GEN connected to the first additional terminal TDO, as well as detection circuitry MDET, for example produced in the form of a logic circuit and connected to the second additional terminal TDI and to the third additional terminal TDIS.

As will be seen in more detail hereinafter, the generation circuitry GEN is configured, upon command from the processing circuitry MT, to deliver a test signal SGNT, for example a pulse, to the first additional terminal TDO, and the detection circuitry MDET is configured to detect the presence or the absence of the test signal on the second and the third additional terminal TDI and TDIS and deliver the result of this detection to the processing circuitry MT.

Figure 12:
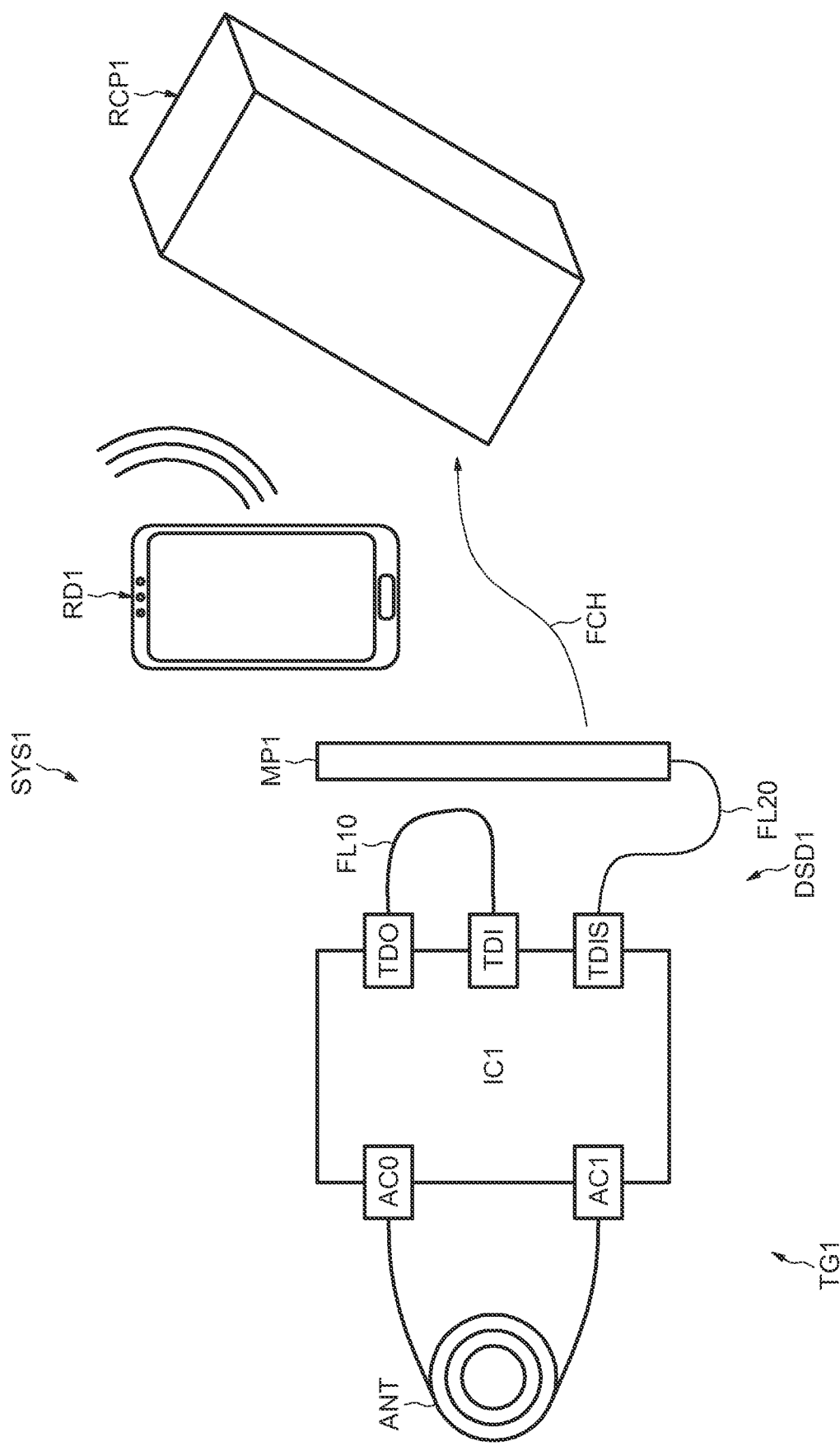

In FIG. 12, the reference SYS1 denotes a system including a detection device DSD1 that is intended to detect for example an attempt to open or opening of a closed container RCP1 that is intended for example to contain a product, for example a perfume bottle.

The detection device DSD1 includes the contactless passive transponder TG1 and a first electrically conductive wire FL10 linking the two additional terminals TDO and TDI of the integrated circuit IC1.

The detection device also includes an electrically conductive element MP1 that is electrically insulated from the first electrically conductive wire FL10 when the container RCP1 is not open or has not been opened and then closed again.

The detection device DSD1 also includes a second electrically conductive wire FL20 linking the third additional terminal TDIS of the integrated circuit IC1 to the electrically conductive element MP1.

As illustrated by the arrow FCH, the detection device is intended to be appropriately placed on the closed container RCP1, as will be described in more detail hereinafter.

Furthermore, a contactless reader RD1, for example a cellular mobile telephone emulated in reader mode, is capable of communicating with the transponder TG.

Generally speaking, the first electrically conductive wire FL10 has a severable part, which may be all or part of the first wire, and the first electrically conductive wire is arranged on the container to be severed at its severable part in the event of opening of or an attempt to open the container.

Moreover, shorting circuitry in this case including the electrically conductive element MP1 and the second electrically conductive wire FL20 is configured to short-circuit the first additional terminal TDO (and also the second additional terminal TDI) with the third additional terminal TDIS, in the event of severing of the severable part of the first electrically conductive wire and reconstruction of an electrical connection between the two additional terminals TDO and TDI.

Figure 13:
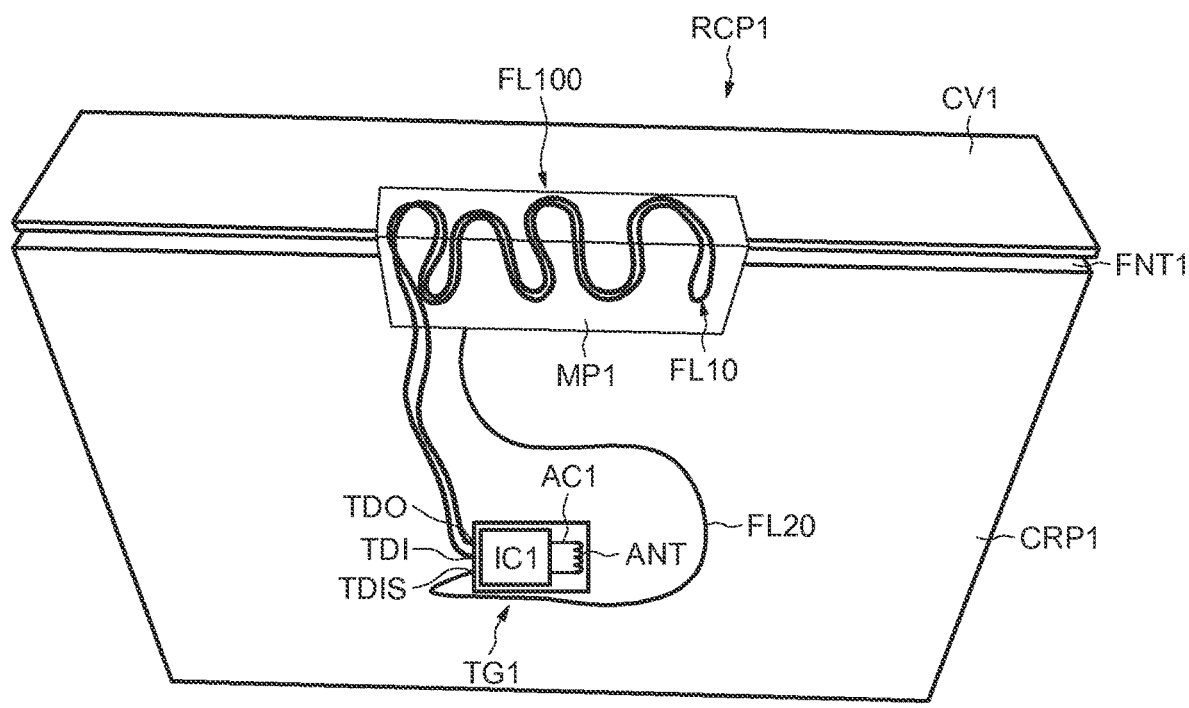

Reference is now made more particularly to FIG. 13 in order to illustrate an exemplary placement of the detection device on a container RCP.

In this example, the container RCP1 is a box including a body CRP1 closed off by a lid CV1 forming a slot FNT1 with the body CRP1.

In this highly schematic example, the electrically conductive element is a metal sheet MP1 attached firstly to the body CRP1 and secondly to the lid CV1 to cover part of the slot FNT1.

The first electrically conductive wire FL10, surrounded by its insulating sleeve, snakes over the metal sheet MP1 to extend alternately over the lid and over the body CRP1.

This snaking part FL100 forms the severable part of the first electrically conductive wire FL10.

Specifically, when the lid CV1 is opened, the wire FL10 will be severed at the severable part FL100.

The drawing of FIG. 13 is not to scale, and those skilled in the art will know how to select the appropriate diameter for the wire FL10 to help guarantee severing thereof when the lid CV1 is opened.

The transponder TG1 is for example attached to a wall of the body CRP1.

The first wire FL10 is linked to the additional terminals TDO and TDI, whereas the second electrically conductive wire FL20 links the metal sheet MP to the third additional terminal TDIS.

Figure 14:
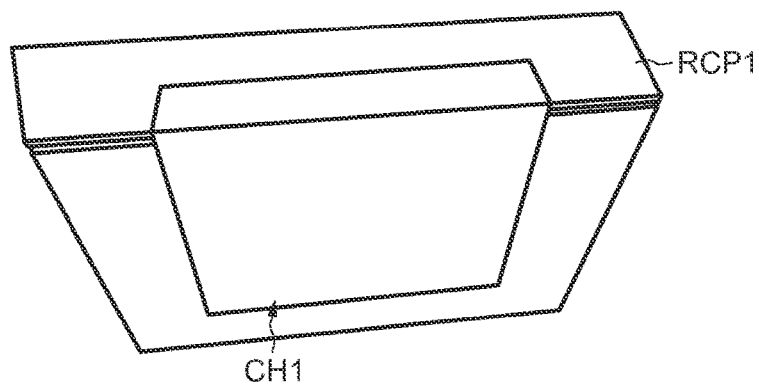

Next, once this assembly has been performed, the assembly is covered by a cover CH1, as illustrated highly schematically in FIG. 14.

Figure 15:
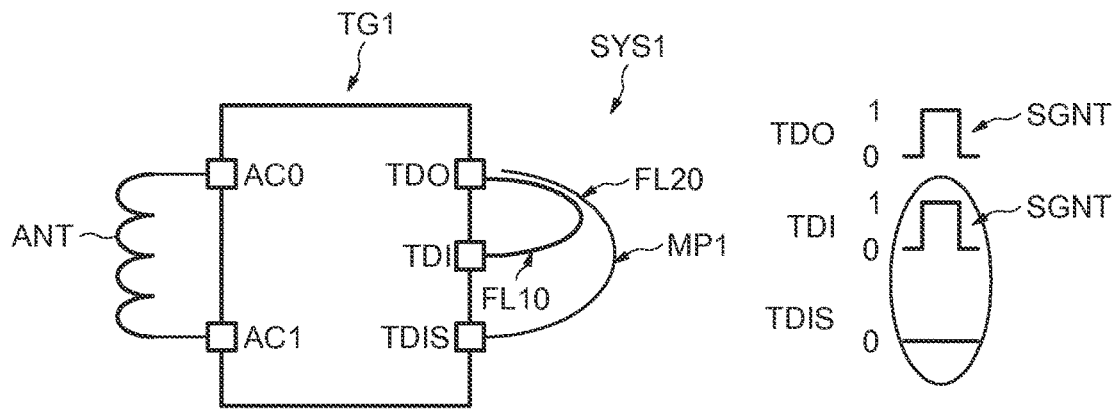
FIG. 15 illustrates another embodiment of a system including a passive transponder disclosed herein.
Figure 16:
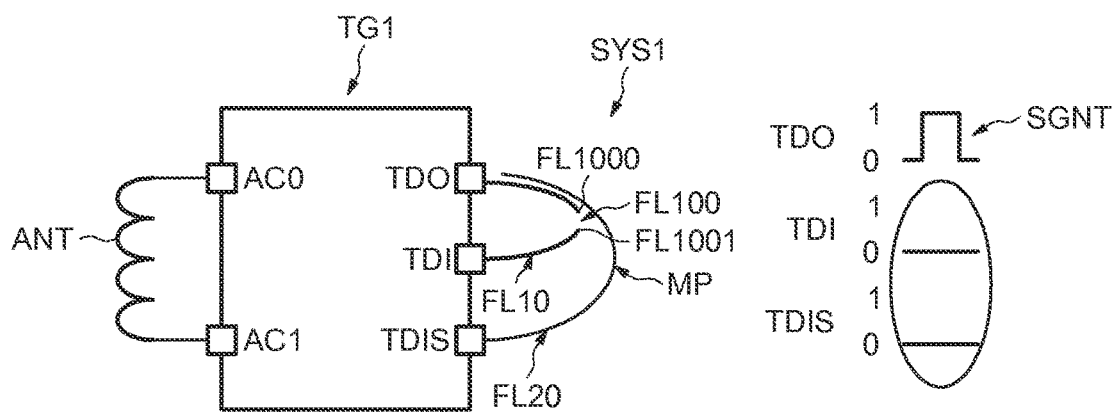
FIG. 16 illustrates a still further embodiment of a system including a passive transponder disclosed herein.
Figure 17:
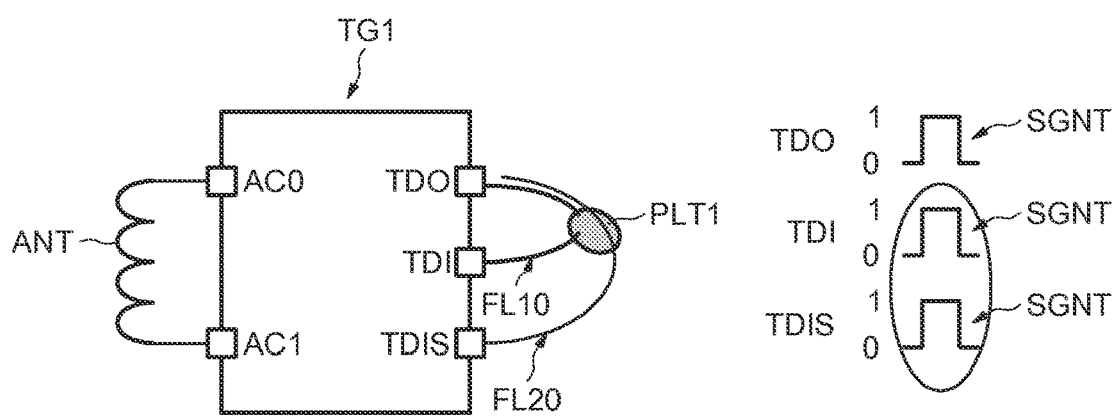
FIG. 17 illustrates an additional embodiment of a system including a passive transponder disclosed herein.

Reference is now made more particularly to FIGS. 15 to 17 in order to illustrate various configurations of the system SYS1.

In FIGS. 15 to 17, the metal element MP1 is part of the second wire FL20.

In a first configuration illustrated in FIG. 15, the first electrically conductive wire FL1 is not severed and is electrically insulated from the metal element MP1.

The processing circuitry of the circuit IC1 controls the generation circuitry to deliver the test signal SGNT to the first additional terminal TDO.

The detection circuitry then detects the presence of the test signal SGNT on the second additional terminal TDI and the absence of this signal on the third additional terminal TDIS.

This information is transmitted to the processing circuitry MT.

This first configuration is representative of an unsevered first wire FL10, corresponding here to an unopened container and therefore to a valid product, for example the perfume bottle.

In FIG. 16, the system SYS1 has an intermediate configuration in which the severable part FL100 of the first conductive wire FL10 has been severed during an attempt to open or opening of the container RCP1.

By contrast, in this intermediate configuration, the electrical connection between the two severed parts of the first wire FL10 has not been reconstructed.

This intermediate configuration corresponds for example to the fact that the container RCP has undergone opening or an opening attempt, and the product therefore cannot be considered valid.

Such an intermediate configuration is detected by the detection circuitry by detecting the absence of the test signal SGNT (generated on the first additional terminal TDO) on the second additional terminal TDI and on the third additional terminal TDIS.

FIG. 17 illustrates a second configuration of the system SYS1 in which the first electrically conductive wire FL10, after having been severed during an opening attempt or opening of the container RCP1, has been joined back together to re-establish the electrical connection between the two additional terminals TDO and TDI.

More particularly, the two severed parts FL1000 and FL1010 of this wire have been brought back into electrical contact using a joining structure, which is in this case a pad of conductive adhesive PLT1, for example.

As a result of this operation, part of the pad of adhesive PLT1 has come into contact with the electrically conductive element MP1 (here part of the second wire FL20), which therefore causes a short circuit via the second electrically conductive wire FL20 and the electrically conductive element MP1, between the first additional terminal TDO (and also the second additional terminal TDI) and the third additional terminal TDIS.

This second configuration is therefore representative of a wire FL10 that has been severed during an attempt to open or opening of the container RCP1 and that has been joined back together in an attempt to make it seem as if the wire had not been severed.

Such a second intermediate configuration is detected by the detection circuitry by detecting the presence of the test signal SGNT (generated on the first additional terminal TDO) on the second additional terminal TDI and on the third additional terminal TDIS.

Figure 18:
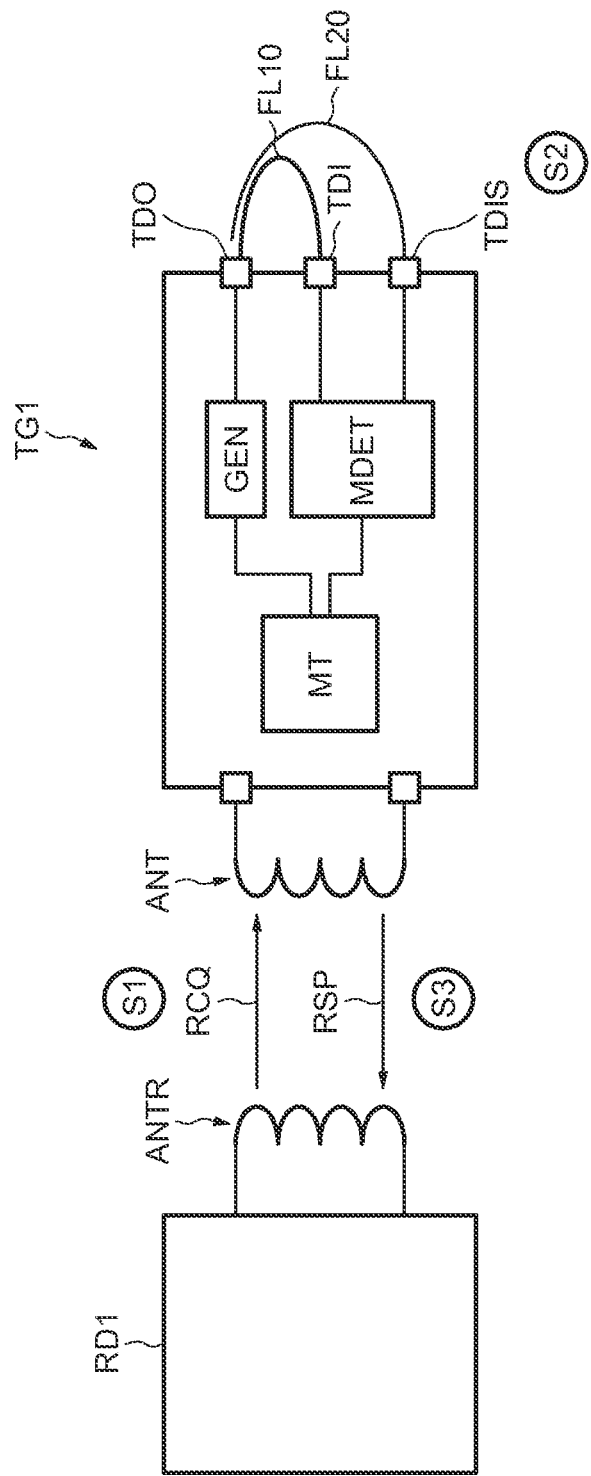
FIG. 18 illustrates a method for communication between a reader and a transponder disclosed herein.

Reference is now made more particularly to FIG. 18, which illustrates one mode of implementation of a method for dialog between the reader RD1 and the transponder TG1, making it possible to detect the configuration of the system corresponding to one of the configurations illustrated in FIGS. 15 to 17.

In a first step 51, the reader sends a request RCQ to the transponder TG1.

This request is processed by the processing circuitry MT, and this controls the generation circuitry GEN such that the test signal is delivered to the first additional terminal TDO and therefore to the first wire FL10.

In step S2, the detection circuitry MDET detects the presence or the absence of the test signal on the second additional terminal TDI and on the third additional terminal TDIS.

This detection information is transmitted to the processing circuitry MT, which encapsulate it in a response RSP that is transmitted to the reader RD1.

The reader decapsulates the response and recovers the detection information.

The user of the reader may then deduce the configuration of the transponder and therefore the status of the product therefrom.

Plus, regardless of the configuration detected, the transponder TG1 remains operational.

This other variant with three additional terminals is not limited to the embodiments and modes of implementation that have just been described.

Other forms of electrically conductive elements are thus possible. Other layouts of the first electrically conductive wire and of the electrically conductive element may be provided depending on the application contemplated and/or on the form of the container.

Likewise, depending on the application contemplated and/or on the form of the container, the severable part of the first electrically conductive wire could be situated in the immediate vicinity of the electrically conductive element without necessarily overlapping it.

Figure 19:
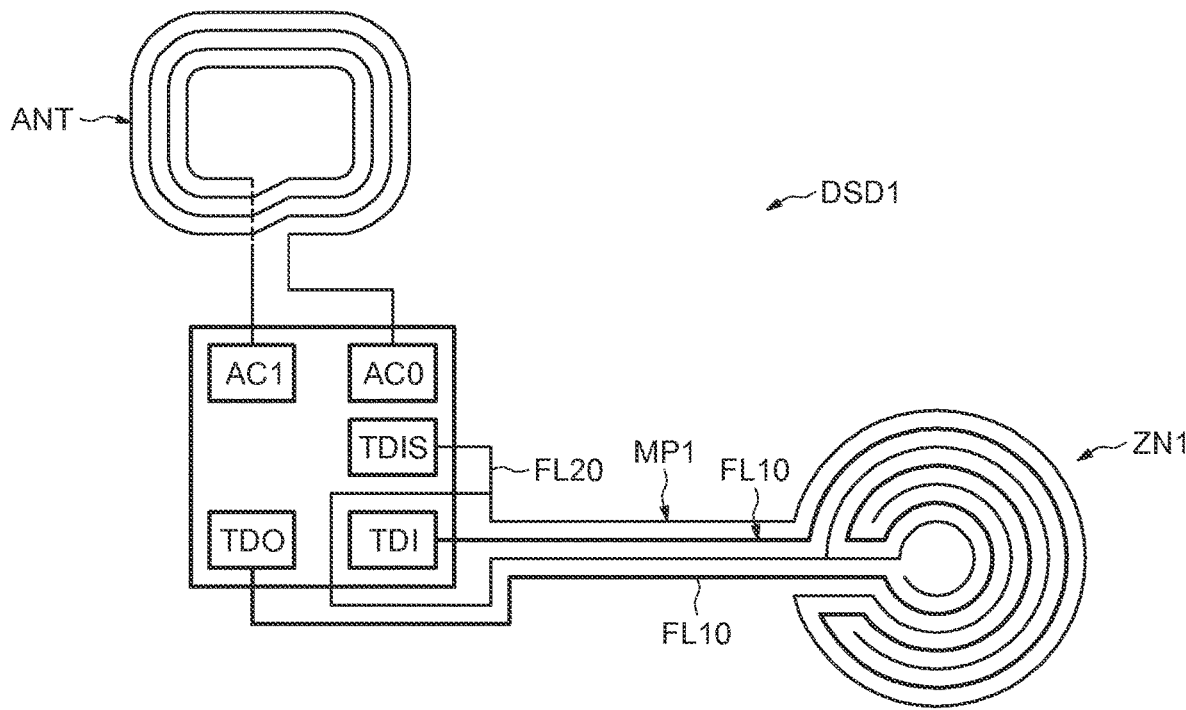
FIG. 19 illustrates another embodiment of a detection device disclosed herein, and FIG. 20 illustrated a further embodiment of a detection device disclosed herein.
Figure 20:
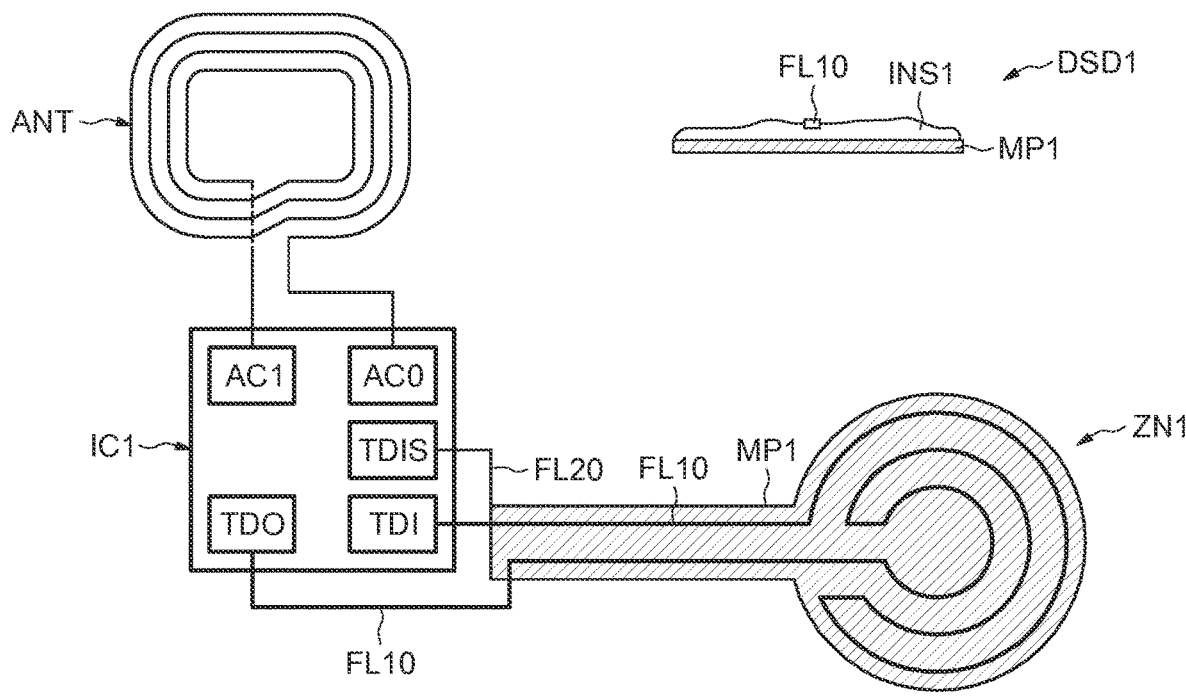

In this respect, reference may be made more particularly to FIGS. 19 and 20, which schematically illustrate two other possible but non-limiting embodiments of the detection device DSD1.

In FIG. 19, the first electrically conductive wire FL10 that links the two additional terminals TDO and TDI includes rectilinear portions extended into a zone ZN1 by way of virtually complete and concentric circles.

The severable part of this wire FL10 may be considered to be all or part of the wire FL10.

The electrically conductive element MP1 in this example includes a wire situated close to the first wire FL10.

This wire MP1 also includes rectilinear portions interwoven with the rectilinear portions of the first wire FL10 and extended into the zone ZN1 by virtually complete and concentric circles that are interwoven with the concentric virtual circles of the first wire FL10.

The second wire FL20 connects the wire MP1 to the third additional terminal TDIS.

Electrical insulation between the first wire FL10 and the wire MP1, when the container RCP1 is not open or has not been opened and then closed again, is in this case achieved by the space between these wires.

By way of indication, this space may be between 10 micrometers and several millimeters, for example 200 micrometers.

The diameter of the wires may also be between 10 micrometers and several millimeters, for example 200 micrometers.

In FIG. 20, the first electrically conductive wire FL10 that links the two additional terminals TDO and TDI has the same form as that illustrated in FIG. 19.

By contrast, the electrically conductive element MP1 in this case includes a flexible or rigid electrically conductive surface element, for example a layer or a metal sheet, supporting the first electrically conductive wire FL10 by way of an insulating layer INS1, having for example a thickness of 200 micrometers, which helps ensure electrical insulation between the conductive layer MP1 and the wire FL10 when the container RCP1 is not open or has not been opened and then closed again.

The second electrically conductive wire FL20 links the conductive layer MP1 to the third additional terminal TDIS.

Although the zone ZN1 has a circular shape in FIGS. 19 and 20, any other regular shape, for example a rectangular shape, or irregular shape would be possible.

More generally, the first electrically conductive wire FL10 may have a spiral shape in the zone ZN1.

Plus, if the electrically conductive element MP1 also includes a wire, as is the case in FIG. 19, this electrically conductive wire MP1 may have a spiral shape in the zone ZN1, the spiral shape being interwoven in the spiral shape of the first electrically conductive wire FL10.

By way of non-limiting example, the distance between the integrated circuit IC1 and the zone ZN1 may be between a few millimeters and around a meter, and the length of the first wire FL10 may be between a few centimeters and around 2 meters.

The invention claimed is:

1. A system, comprising:
a closed container; and
a detection device comprising a contactless passive transponder configured to communicate with a reader via an antenna using a carrier signal, the contactless passive transponder including:
an integrated circuit having two input terminals connected to the antenna and two output terminals linked by a first electrically conductive wire having a severable part and designed to be severed at the severable part in response to an opening or an attempted opening of the closed container; and
a shorting circuit configured to short-circuit a first one of the two output terminals with a first one of the two input terminals in response to a severing of the severable part and reconstruction of an electrical connection between the two output terminals, wherein said shorting circuit comprises an electrically conductive element arranged adjacent the severable part of the first electrically conductive wire and linked to a first of the two input terminals by a second electrically conductive wire, said electrically conductive element being electrically insulated from the first electrically conductive wire in an absence of severing of said first electrically conductive wire;
wherein the detection device has a first configuration in which the first electrically conductive wire is not severed and is electrically insulated from the shorting circuit, and has a second configuration in which the first electrically conductive wire is severed at the severable part to form two wire parts, wherein ends of the two wire parts are electrically joined back together by an electrically conductive joining material also coming into contact with a part of the shorting circuit, wherein the electrically conductive joining material makes contact with the electrically conductive element and the first electrically conductive wire when the detection device is in said second configuration.

2. The system according to claim 1, wherein the electrically conductive element comprises an electrically conductive surface element.

3. The system according to claim 2, wherein, in the absence of severing of the first electrically conductive wire, the severable part of the first wire is supported by the electrically conductive surface element and is electrically insulated from the electrically conductive surface element by an insulating layer.

4. The system according to claim 1, wherein the electrically conductive element comprises the second electrically conductive wire extending adjacent to and along the severable part of the first electrically conductive wire, the second electrically conductive wire and the first electrically conductive wire being separated in the absence of severing of the first electrically conductive wire.

5. The system according to claim 4, wherein the first electrically conductive wire has a spiral shape in one zone.

6. The system according to claim 5, wherein the second electrically conductive wire has a spiral shape in the one zone, wherein the spiral shape of the second electrically conductive wire is interwoven in the spiral shape of the first electrically conductive wire.

7. The system according to claim 1, further comprising circuitry configured to detect severing of the severable part of the first electrically conductive wire followed by reconstruction of an electrical connection between the two output terminals, wherein said circuitry operates to detect a lack of response from the transponder in response to presence of a magnetic field emitted by a reader.

8. A system comprising:
a container;
a detection device comprising a contactless passive transponder configured to communicate with a reader via an antenna using a carrier signal;
wherein the contactless transponder includes an integrated circuit having first and second antenna terminals connected to the antenna, and first and second additional terminals that are linked by a first electrically conductive wire;
the first electrically conductive wire having:
a severable part and configured to be severed at the severable part in response to an opening or attempted opening of the container; and
shorting circuitry configured to short-circuit the first additional terminal with another terminal of the integrated circuit in response to severing of the severable part and reconstruction of an electrical connection between the first and second additional terminals;
wherein the integrated circuit comprises generation circuitry configured to deliver a test signal to the first additional terminal, and detection circuitry configured to detect presence or absence of said test signal on the second additional terminal and on a third additional terminal;
wherein the detection circuitry, in a first configuration in which the first electrically conductive wire is not severed, is configured to detect presence of the test signal on the second additional terminal and the absence of the test signal on the third additional terminal; and
wherein the detection circuitry, in a second configuration in which the first electrically conductive wire has been rejoined after having been severed, is configured to detect presence of the test signal on the second additional terminal and on the third additional terminal;
wherein detection of presence of the test signal on the second additional terminal and detection of the absence of the test signal on the third additional terminal by the detection circuitry is indicative of the container not having been opened;
wherein the detection of presence of the test signal on the second additional terminal and on the third additional terminal by the detection circuitry is indicative of the container having been opened but the first electrically conductive wire having been rejoined after being severed.

9. The system of claim 8,
wherein, when the detection circuitry is in an intermediate configuration in which the severable part of the of the first electrically conductive wire has been severed, the first electrically conductive wire is severed at the severable part to form two wire parts that are not in electrical contact and are electrically insulated from the shorting circuitry, and wherein the detection circuitry is configured to detect an absence of the test signal on the second additional terminal and on the third additional terminal.

10. The system of claim 9, wherein detection of presence of the test signal on the second additional terminal and detection of the absence of the test signal on the third additional terminal by the detection circuitry is indicative of the container not having been opened.

* * * * *

UNITED STATES PATENT AND TRADEMARK OFFICE
CERTIFICATE OF CORRECTION

PATENT NO. : 11,928,541 B2
APPLICATION NO. : 17/292149
DATED : March 12, 2024
INVENTOR(S) : Jose Mangione et al.

Page 1 of 1

It is certified that error appears in the above-identified patent and that said Letters Patent is hereby corrected as shown below:

In the Specification

At Column 13, Line 4, [[step 51,]] should be corrected to read -- step S1, --

Signed and Sealed this
Tenth Day of February, 2026

John A. Squires
*Director of the United States Patent and Trademark Office*